June 15, 1937.  E. A. WHEELER  2,083,885
FASTENER
Original Filed July 15, 1935

INVENTOR.
Earl A. Wheeler
BY Lyon & Lyon
ATTORNEYS

Patented June 15, 1937

2,083,885

UNITED STATES PATENT OFFICE 2,083,885

FASTENER

Earl A. Wheeler, Maywood, Calif., assignor to Lillian Mae Rae, Huntington Park, Calif.

Application July 15, 1935, Serial No. 31,313
Renewed November 9, 1936

4 Claims. (Cl. 24—264)

This invention relates to the effecting of a connection between a fastener and a fabric, and the invention is particularly applicable for effecting an attachment to a garment, for example, a hose, for supporting the same. Heretofore fasteners have been employed for this purpose, which present an eye through which a fold of the hose is inserted and in which the fold is then pulled down into a slot communicating with the eye. The slot has usually been of tapered form so that the fold jams itself tightly in the slot or at the end of the slot. Such devices have generally been unsatisfactory because they concentrate the strain usually at the bottom of the slot and they tend to tear the hose or start a "run" in it.

The general object of this invention is to produce a connection of this type but constructed in such a way as to prevent unduly straining the hose, and which can be used without danger of starting a run in the hose.

A further object of the invention is to provide a connection of this kind, in which the fastener is so constructed that when the fold of the hose is pulled into the slot, the fastener will present a second slot in which the protruding fold will jam itself, thereby retaining the fold of the hose in the first-named slot without unduly straining the material of the hose.

A further object of the invention is to provide an efficient fastener, which is very simple and inexpensive to manufacture, which will support the hose without injuring the same even if a pull of great force is exerted by the hose on the fastener, and which can be easily secured to the hose.

Further objects of the invention will appear hereinafter.

The invention consists in the novel parts and combination of parts to be described hereinafter, all of which contribute to produce an efficient fastener for hose.

A preferred embodiment of the invention is described in the following specification, while the broad scope of the invention is pointed out in the appended claims.

Figure 1:
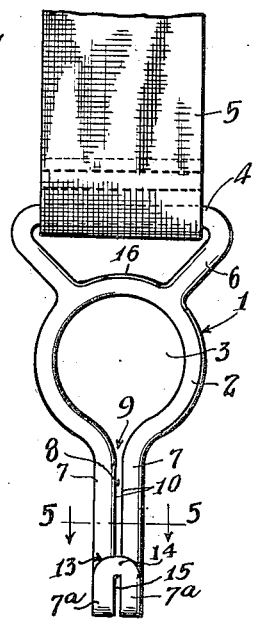
Figure 1 is a front elevation of a fastener embodied in my invention and showing a short portion of a supporting band broken away.
Figure 2:
Fig. 2 is a side elevation of a fastener and band illustrated in Fig. 1.
Figure 3:
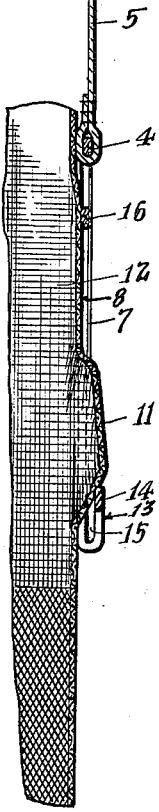
Fig. 3 is a vertical section through the upper portion of a hose and through the fastener illustrated in Figs. 1 and 2, and illustrating the manner in which the hose and fastener cooperate to produce the connection between them.
Figure 4:
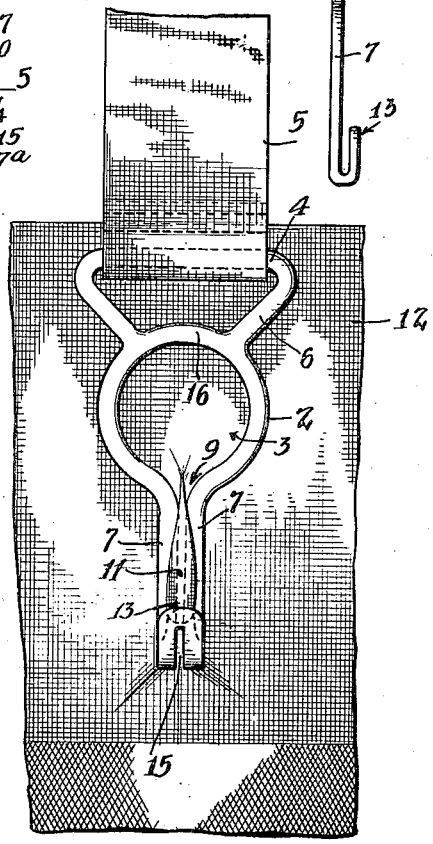
Fig. 4 is a front elevation showing a fragment of hose and illustrating the fastener in engagement therewith. In other words, this view is a front elevation of the parts illustrated in Fig. 3.

Referring more particularly to the parts, 1 indicates a fastener which is preferably formed as a stamping from rigid material, such as light sheet metal, and this fastener has a substantially circular body 2 surrounding a central space or "eye" 3. The fastener is provided at one end, for example, its upper end, with means such as an integral bar 4 to enable the fastener to be attached to a band 5. The bar 4 connects to the body 2 by inclined bars 6. At the end of the fastener, for example, the lower end as illustrated in Fig. 1, the material of the fastener is extended downwardly from the body 2 so that it presents two oppositely disposed bars 7, which are disposed slightly apart so as to form a slot 8, which preferably has a flaring mouth 9 communicating with the "eye" 3. The edges 10 of the bars 7 are therefore substantially parallel with each other. In using the fastener, a fold or loop 11 of the material of the hose 12 is pulled through the eye 3 and then the fastener is pulled upwardly on the hose so that the flaring mouth 9 will guide the loop into the slot 8. Toward the lower ends the bars 7 are provided with means for limiting the relative downward movement of the loop 11 in the slot 8. This means prevents the loop 11 from reaching the lower end of the slot and forms a stop at which the loop becomes jammed. In the present instance this is accomplished by bending upwardly the lower ends of the bars or forks 7 to form a bill 13, the upwardly turned ends 7a of the forks being united integrally by a rounded nose 14. The bill 13, as illustrated in Figs. 2 and 3, is located slightly out of the plane of the body of the fastener, so that a second slot 15 is formed between the outer faces of the bars 7 and the inner face of the bill 13. With this organization of parts it will be evident that when tension comes on the hose the fold 11 of material will become jammed between the inner face of the bill 13 and the outer faces of the forks or bars 7. At this point, however, there is considerable area of metal that exerts the clamping pressure on the material and hence there is no tendency to concentrate the strain at a single point. Furthermore, by reason of the fact that the slot 8 is of substantially uniform diameter, the strain on the material is distributed substantially equally throughout the entire length of this slot.

In order to increase the rigidity of the bars 7 and prevent their opening up with too little resistance when the fold of material is pulled into the slot 8, I prefer that the fastener shall include a bar 16 connecting the bars or forks 6 and forming a closure for the upper side of the "eye" 3. However, if the body 2 is made of relatively thick material it might have sufficient rigidity without employing this bar 16.

Figure 5:
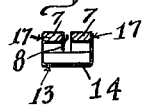
Fig. 5 is a cross-section on the line 5—5 of Fig. 1, and particularly illustrating the details of the construction at the lower portion of the fastener.

The corners 17 of the bars 7 are preferably slightly rounded as indicated in Fig. 5, so that they will not have any tendency to cut into the material of the hose, and preferably this type of cross-section is followed throughout the entire fastening. These rounded corners can be formed by the dies when the fasteners are blanked out from the material and the lower ends of the bars 7 bent up to form the bill 13.

It will be evident that by the use of this invention the hose can be readily secured, and that it will be supported without developing undue concentrated strains which might tend to tear the hose or produce "runs" in the hose.

It will also be evident that in accordance with my invention the fastener is constructed so that it presents two slots located in different planes, that is to say, it presents one slot for the fold of material to be received in, and a second slot located in the plane removed from the plane of the first slot, so that when the material is pulled along the first slot it will jam in the second slot.

What I claim is:—

1. A fastener for hose having a body with means at one end for attaching a band to the same, said fastener having an eye through which a fold of the hose may be inserted, and having an elongated slot extending from said eye and communicating therewith, said fastener having means located at an intermediate point of said slot spaced from the plane of the body of the fastener for engaging the said fold to prevent the same from reaching the end of the slot.

2. A fastener to be secured to a fabric, said fastener having an eye through which a fold of the fabric may be inserted and having a pair of oppositely disposed bars spaced apart and forming an elongated slot extending from said eye and communicating therewith, said bars having an extension located at a point removed from said eye and located in a plane spaced from the plane of the bars so as to form a second slot for engaging a fold of the fabric introduced through the eye and pulled down into the first-named slot, said extension and second slot forming an open throat operating to clamp the fold in the second slot between the extension and the said bars and limit the movement of the fold along the first slot.

3. A fastener to be secured to a fabric, said fastener having an eye through which a fold of the fabric may be inserted and having a pair of oppositely disposed bars spaced apart and forming an elongated slot extending from said eye and communicating therewith, the ends of said bars remote from the eye being bent inwardly and connected together to form a bill projecting longitudinally of the slot and spaced from the same so as to form a second open slot to engage a fold of fabric when the same is passed through the eye and pulled outwardly in the slot, said bill operating to press the fold of fabric in the second slot against the bars, and limit the outward movement of the fold along the first-named slot.

4. A fastener to be secured to a fabric, having a slot to receive a fold of a fabric and having a second open slot located out of the plane of the first-named slot and operating to receive the fold of the fabric and holding the same.

EARL A. WHEELER.